United States Patent
Nandyalam et al.

(10) Patent No.: US 10,244,080 B2
(45) Date of Patent: Mar. 26, 2019

(54) ACCESSING MULTIPLE CONVERGED IT INFRASTRUCTURES

(71) Applicant: VCE Company, LLC, Marlborough, MA (US)

(72) Inventors: Rajesh Nandyalam, Whitinsville, MA (US); Venkatesh Madhipatla, Westford, MA (US); Xiaohong Catherine Fu, Plano, TX (US); Bayi Peng, Plano, TX (US)

(73) Assignee: VCE IP Holding Company LLC, Richardson, TX (US)

( * ) Notice: Subject to any disclaimer, the term of this patent is extended or adjusted under 35 U.S.C. 154(b) by 547 days.

(21) Appl. No.: 13/843,262

(22) Filed: Mar. 15, 2013

(65) Prior Publication Data
US 2014/0280489 A1 Sep. 18, 2014

(51) Int. Cl.
*H04L 29/06* (2006.01)
*H04L 12/24* (2006.01)
*G06F 11/30* (2006.01)
*G06F 11/34* (2006.01)

(52) U.S. Cl.
CPC .......... *H04L 67/42* (2013.01); *G06F 11/3006* (2013.01); *G06F 11/3409* (2013.01); *H04L 41/0853* (2013.01); *G06F 11/3051* (2013.01); *G06F 11/3495* (2013.01)

(58) Field of Classification Search
USPC ........................................................ 709/203
See application file for complete search history.

(56) References Cited

U.S. PATENT DOCUMENTS

| 5,781,740 A * | 7/1998 | Tanaka .......................... 709/229 |
| 6,199,116 B1 * | 3/2001 | May .......................... G06F 9/542 |
| | | 709/204 |

(Continued)

FOREIGN PATENT DOCUMENTS

GB 2 367 165 3/2002

OTHER PUBLICATIONS

James Turner, "Hadoop: What it is, how it works, and what it can do," (http://strata.oreilly.com/2011/01/what-is-hadoop.html) Jan. 12, 2011.

(Continued)

*Primary Examiner* — Backhean Tiv
(74) *Attorney, Agent, or Firm* — Womble Bond Dickinson (US) LLP (57) ABSTRACT

A technique for communicating with multiple Converged IT Infrastructures (CITIs) includes accessing any CITI that is part of a group of multiple CITIs by accessing a single CITI within the group. In an example, each CITI has a representative converged infrastructure coordinator (CIC), which stores information about the respective CITI. When any CITI in the group receives a request from a client for information about any other CITI in the group, the CIC of the CITI receiving the request contacts the CIC of the other CITI and obtains the requested information about the other CITI from its CIC. In some examples, the CIC also acts to aggregate, filter, and/or analyze information gathered from multiple CITIs in the group, and thus allows clients to receive processed data pertaining to many CITIs in response to simple commands.

18 Claims, 4 Drawing Sheets

(56) References Cited

U.S. PATENT DOCUMENTS

| | | | | |
|---|---|---|---|---|
| 6,615,245 | B1* | 9/2003 | McFall | H04L 43/0817 |
| | | | | 707/E17.032 |
| 6,981,263 | B1* | 12/2005 | Zhang | G06Q 50/188 |
| | | | | 709/217 |
| 7,103,644 | B1* | 9/2006 | Zhang et al. | 709/219 |
| 8,489,834 | B1* | 7/2013 | Kumbhari | H04L 67/1097 |
| | | | | 711/162 |
| 8,756,441 | B1* | 6/2014 | Mullins | G06F 1/3209 |
| | | | | 713/2 |
| 8,849,995 | B1* | 9/2014 | Gabrielson | H04L 41/5035 |
| | | | | 709/223 |
| 8,890,676 | B1* | 11/2014 | Heath | G08B 29/188 |
| | | | | 340/3.1 |
| 9,331,977 | B2* | 5/2016 | Chong | H04L 41/50 |
| 2001/0056335 | A1* | 12/2001 | Ikeda | G05B 23/0264 |
| | | | | 702/188 |
| 2002/0156847 | A1* | 10/2002 | Kitamura | 709/203 |
| 2003/0050971 | A1* | 3/2003 | Okuyama | G06F 11/3006 |
| | | | | 709/203 |
| 2005/0086646 | A1* | 4/2005 | Zahavi | G06F 11/3476 |
| | | | | 717/131 |
| 2006/0036761 | A1* | 2/2006 | Amra | H04L 67/1095 |
| | | | | 709/238 |
| 2006/0294439 | A1* | 12/2006 | Rolia | G06F 11/3086 |
| | | | | 714/47.1 |
| 2007/0061460 | A1* | 3/2007 | Khan | H04L 41/00 |
| | | | | 709/225 |
| 2007/0168336 | A1* | 7/2007 | Ransil | G06F 17/3089 |
| 2008/0040306 | A1* | 2/2008 | Ma | H04L 67/327 |
| 2008/0077663 | A1* | 3/2008 | Zarenin | H04L 41/0853 |
| | | | | 709/203 |
| 2008/0120129 | A1* | 5/2008 | Seubert et al. | 705/1 |
| 2008/0240724 | A1* | 10/2008 | Aguren | G06Q 10/06 |
| | | | | 398/139 |
| 2008/0271122 | A1* | 10/2008 | Nolan | G06F 21/32 |
| | | | | 726/4 |
| 2009/0037914 | A1* | 2/2009 | Chagoly et al. | 718/101 |
| 2009/0055507 | A1* | 2/2009 | Oeda | G06F 9/4856 |
| | | | | 709/216 |
| 2009/0144393 | A1* | 6/2009 | Kudo | G06F 9/5044 |
| | | | | 709/218 |
| 2009/0172689 | A1* | 7/2009 | Bobak | G06F 9/5061 |
| | | | | 718/104 |
| 2010/0008482 | A1* | 1/2010 | Tucker | H04Q 1/136 |
| | | | | 379/93.05 |
| 2010/0131928 | A1* | 5/2010 | Parthasarathy | G06F 11/3664 |
| | | | | 717/126 |
| 2010/0218186 | A1* | 8/2010 | Wolfe | G06F 9/4856 |
| | | | | 718/100 |
| 2010/0251242 | A1* | 9/2010 | Sivasubramanian et al. | |
| | | | | 718/100 |
| 2011/0029333 | A1* | 2/2011 | Zytman | G06Q 10/02 |
| | | | | 705/5 |
| 2011/0055385 | A1* | 3/2011 | Tung | G06F 9/5072 |
| | | | | 709/224 |
| 2011/0082599 | A1* | 4/2011 | Shinde | H02J 13/0003 |
| | | | | 700/295 |
| 2011/0099146 | A1* | 4/2011 | McAlister | G06F 11/3006 |
| | | | | 707/634 |
| 2011/0145699 | A1* | 6/2011 | Kheiri | G06F 8/73 |
| | | | | 715/236 |
| 2011/0209147 | A1* | 8/2011 | Box | G06F 9/5077 |
| | | | | 718/1 |
| 2012/0005344 | A1* | 1/2012 | Kolin | H05K 7/20836 |
| | | | | 709/226 |
| 2012/0042033 | A1* | 2/2012 | Ayala, Jr. | G06F 9/4856 |
| | | | | 709/216 |
| 2012/0102039 | A1* | 4/2012 | Gifford | G06F 17/30545 |
| | | | | 707/741 |
| 2012/0259894 | A1* | 10/2012 | Varley | G06F 17/30575 |
| | | | | 707/795 |
| 2013/0014107 | A1 | 1/2013 | Kirchhofer | |
| 2013/0166250 | A1* | 6/2013 | Vijaykumar | G06F 11/3062 |
| | | | | 702/182 |
| 2013/0190899 | A1* | 7/2013 | Slessman | G05B 13/02 |
| | | | | 700/28 |
| 2014/0006581 | A1* | 1/2014 | Raghu | G06F 9/5072 |
| | | | | 709/223 |
| 2014/0006594 | A1* | 1/2014 | Gabriel | H04L 43/10 |
| | | | | 709/224 |
| 2014/0059196 | A1* | 2/2014 | Onffroy | H04L 41/0856 |
| | | | | 709/223 |
| 2014/0089488 | A1* | 3/2014 | Chong | H04L 41/50 |
| | | | | 709/223 |
| 2014/0149280 | A1* | 5/2014 | Karkhanis | G06Q 20/38 |
| | | | | 705/39 |
| 2014/0280489 | A1* | 9/2014 | Nandyalem | H04L 67/42 |
| | | | | 709/203 |
| 2014/0280818 | A1* | 9/2014 | Kim | H04L 47/125 |
| | | | | 709/223 |
| 2015/0327408 | A1* | 11/2015 | Ruiz | H05K 7/20745 |
| | | | | 361/679.46 |
| 2015/0333977 | A1* | 11/2015 | Box | G06F 9/5077 |
| | | | | 709/226 |

OTHER PUBLICATIONS

Jonathan Ellis, "Apache Cassandra: Real-world scalability, today," (http://www.slideshare.net/jbellis/cassandra-at-nosql-matters-2012) 2012.

Roy Thomas Fielding, "Architectural Styles and the Design of Network-based Software Architectures," (http://www.ics.uci.edu/~fielding/pubs/dissertation/rest_arch_style.htm) Chapter 5 2000.

Mohan Rao Cavale, "Introducing Microsoft Cluster Service (MSCS) in the Windows Server 2003 Family," (http://msdn.microsoft.com/en-us/library/ms952401.aspx) Nov. 2002.

P. Mockapetris; Network Working Group; Request for Comments: 883; *Domain Names—Implementation and Specification*; ISI; Nov. 1983.

International Search Report and Written Opinion of the International Searching Authority for corresponding International Application No. PCT/US2014/021635 dated Aug. 6, 2014.

* cited by examiner

ACCESSING MULTIPLE CONVERGED IT INFRASTRUCTURES

BACKGROUND

Data centers are facilities for housing computer systems, which perform a diverse range of functions, such as hosting websites, warehousing information, and providing cloud-based computing solutions for remote users. To support such functions, data centers typically include a myriad of components, such as computing servers, network switches, and data storage arrays, for example.

The various components of a data center are commonly connected to a network. For example, components may be connected together by a local area network (LAN), which in turn may be connected to the Internet or some other wide area network (WAN). Organizations, such as companies, often own or lease multiple data centers at different geographical locations. Administrators may operate software to access the components of the various data centers over the Internet.

Data centers are sometimes provided in the form of integrated systems, which include preconfigured groupings of network, compute, storage, and other components. Such integrated systems are known in the art as "Converged IT Infrastructures," which are referred to herein by the acronym "CITIs." Examples of CITIs include the Vblock™ family of converged IT infrastructure systems, which are available from VCE Company of Richardson, Tex.

SUMMARY

Computer software developed for CITIs may include an object model for representing a CITI and its components as a group of software objects. In one example, a CITI performs a discovery operation, which electronically contacts various network, compute, storage, and other components of the CITI, e.g., over a LAN, enquires about the characteristics of the components, and stores the characteristics in an object model instance for the CITI.

System administrators can operate a software tool to access the object model instance of the CITI and thereby to obtain information about the CITI, including its configuration and performance data, for example. The performance data may relate to CPU utilization, free storage space, network activity, and/or other factors relevant to the CITI. Sometimes, administrators wish to obtain information about multiple CITIs. For example, an administrator may operate a software tool to find out which CITI of many CITIs has the least CPU utilization. The administrator may then select that CITI with the least CPU utilization for receiving additional workload.

Other software tools may monitor the performance of multiple CITIs by accessing their object model instances. For example, one software tool may communicate with multiple CITIs at once, continually checking their object model instances for any changes in performance, or for any other changes that might require attention.

Unfortunately, these software tools, and/or the computers on which they are run, can easily become overburdened when communicating with a large number of CITIs. Large organizations may own or lease hundreds or even thousands of individual CITIs, all of which may be required to be monitored and controlled. Maintaining individual communication sessions with thousands of separate CITIs can quickly consume available computer resources. Also, operations that involve comparing information received from different CITIs can require considerable effort on the part of administrators. What is needed is a less burdensome way of communicating with multiple CITIs and managing information obtained from the CITIs.

In contrast with prior data center technologies, an improved technique for communicating with multiple Converged IT Infrastructures (CITIs) includes accessing any CITI that is part of a group of multiple CITIs by accessing a single CITI within the group. In an example, each CITI has a representative converged infrastructure coordinator (CIC), which stores information about the respective CITI. When any CITI in the group receives a request from a client for information about any other CITI in the group, the CIC of the CITI receiving the request contacts the CIC of the other CITI and obtains the requested information about the other CITI from its CIC. In this manner, the client need only communicate with a single CITI to obtain information about any CITI in the group. The burdensome task of maintaining communication with multiple CITIs is therefore reduced or eliminated altogether. In some examples, the CIC also acts to aggregate, filter, and/or analyze information gathered from multiple CITIs in the group, and thus allows clients to receive processed data pertaining to many CITIs in response to simple commands.

Certain embodiments are directed to a method of communicating among Converged IT Infrastructures (CITIs). The CITIs each include one or more network switches, compute servers, and storage arrays. The method includes receiving a first request, from a client by a first CITI. The first request requests CITI-specific information about a second CITI. The CITI-specific information pertains to at least one of a network switch, a compute server, and a storage array of the second CITI. The method also includes sending a second request, by the first CITI to the second CITI over a network and in response to receiving the first request. The second request requests the CITI-specific information from the second CITI. The method further includes receiving, by the first CITI over the network and in response to the second request, the CITI-specific information about the second CITI, and returning the CITI-specific information received from the second CITI to the client.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. The drawings are not necessarily to scale, emphasis instead being placed upon illustrating the principles of various embodiments of the invention. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for communicating with multiple Converged IT Infrastructures (CITIs) includes accessing any CITI that is part of a group of multiple CITIs by accessing a single CITI within the group.

Figure 1:
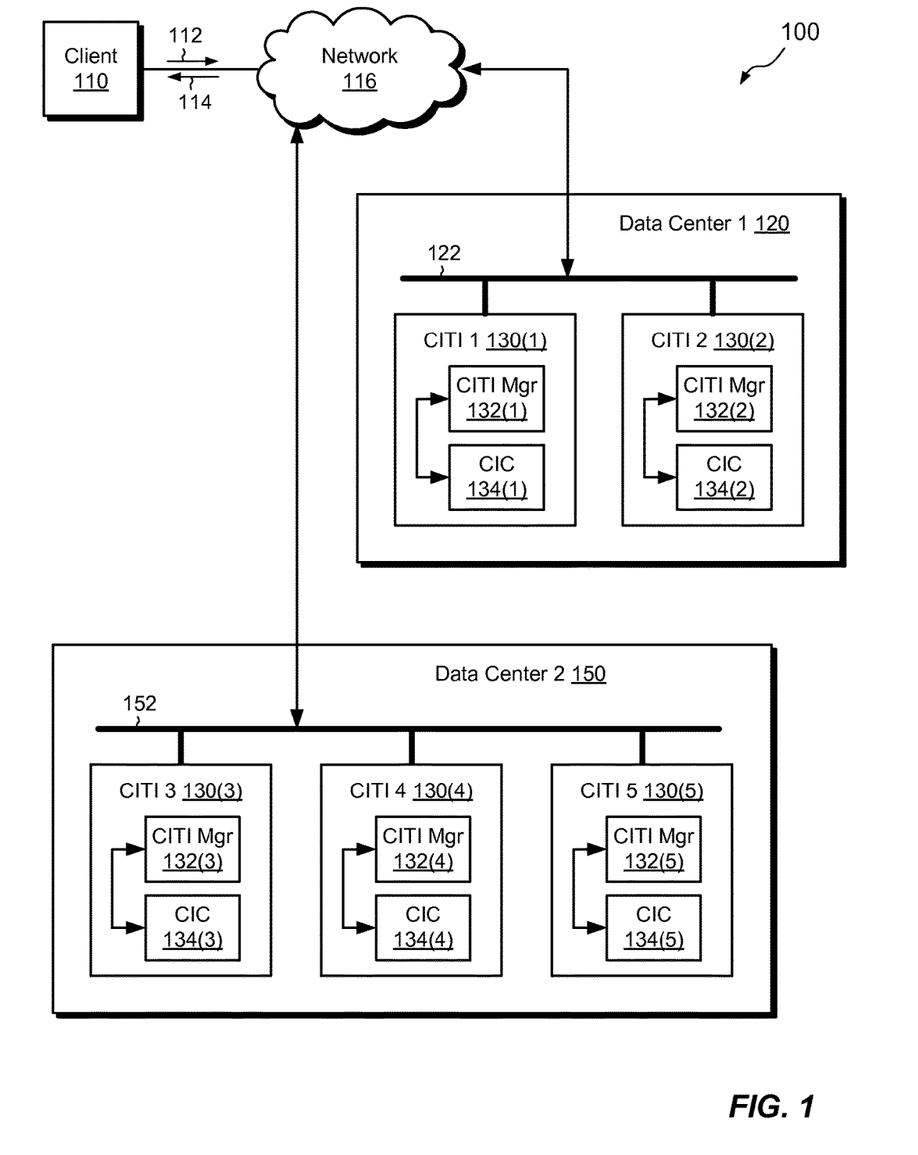
FIG. 1 is a block diagram of an example environment of multiple data centers each including Converged IT Infrastructures (CITIs), in which the improvements hereof may be practiced.

FIG. 1 shows an example environment 100 in which embodiments of the improved technique hereof can be practiced. Here, a client 110 can connect to a first data center 120 and to a second data center 150 over a network 116. In an example, the data centers 120 and 150 are geographically separate from each other. For example, the first data center 120 may be located in the United States, whereas the second data center 150 may be located in India. The first data center 120 includes a first CITI 130(1) and a second CITI 130(2). The first and second CITIs 130(1-2) are connected together by a local area network (LAN) 122 or some other network within the data center 120. Similarly, the second data center 150 includes a third CITI 130(3), a fourth CITI 130(4), and a fifth CITI 130(5). The third, fourth, and fifth CITIs 130(3-5) are connected together via a LAN 152 or some other network. Although two data centers 120 and 150 are shown, it is understood that the environment 100 may include any number of data centers, each of which may include any number of CITIs.

Each of the CITIs 130(1-5) typically includes a preconfigured collection of network, compute, and storage components (not shown). Many of the components of each of the CITIs 130(1-5) have their own network interfaces and can thus connect to a respective LAN for communicating with other components or with one or more control stations, for example. For instance, the components of CITIs 130(1-2) connect to the LAN 122, and the components of CITIs 130(3-5) connect to the LAN 152. In some examples, the network-accessible components (e.g., network, compute, and storage) within each CITI form their own internal LAN, and the internal LANs each connect to a respective LAN (122 or 152) via a router.

In an example, the network 116 is the Internet or some other wide area network (WAN), which may include any combination of wired and/or wireless components. In an example, the network 116 connects to the LANs 122 and 152 using routers, switches, and/or other network components. Although the network 116, LAN 122, LAN 152, and any internal LANs within the CITIs are described as separate networks, it is understood that they may instead be regarded as a single network having multiple components.

Each of the CITIs 130(i) includes a CITI manager 132(i) and a Converged Infrastructure Coordinator (CIC) 134(i), which may be realized as software constructs. In an example, each CITI manager performs a discovery operation on components of the CITI in which the CITI manager resides and builds an object model instance that reflects the actual configurations and settings of the components. The CITI manager then stores the object model instance locally as well as in the respective CIC. The client 110 may access the object model instance (e.g., over the network), query the CITI about its configuration and performance, and, in some examples, control the components of the CITI.

The CICs 134(1-5) together form a distributed database that stores CITI-specific information obtained from all the object model instances of the CITIs 130(1-5). The CICs 134(1-5) are configured to communicate with one another, such that each CIC is able to obtain CITI-specific information of any of the CITIs. In some examples, the CICs are further configured to control any CITI in the environment 100.

CITIs may be assigned to groups. Communication among CICs may then be limited to group members only. For example, a company may operate CITIs at various data centers around the world and define a group that includes all CITIs the company operates. Alternatively, a group may be formed based on a particular cloud-based computer application that the CITIs run. CITIs running the same application may be configured as members of the same group, while CITIs running different applications may be configured to be members of other groups. Hierarchies of groups may also be implemented, where, for example, all CITIs operated by a company are part of a high-level group, whereas CITIs of the high-level group may be assigned to different lower-level groups based on application, geography, CITI configuration, and/or any other suitable factors. Access to information in the different groups may be limited based on privileges of the client. High-level administrators may thus have access to the high-order group and all its members, whereas lower-level personnel may be limited to access to particular sub-groups. In an example, group membership of any of the CITIs 130(1-5) is configured within the CIC of the respective CITI. For purposes of illustration, only a single group is considered here, which consists of all the CITIs 130(1-5).

In operation, the client 110 issues a request 112 over the network. The request 112 is received by a particular CITI, e.g., the CITI 130(1). In an example, the request 112 specifies CITI-specific information to be obtained about any CITI in the environment 100. The CITI-specific information includes configuration and/or performance information about any component or components of a particular CITI, or about the CITI as a whole. If the request 112 pertains to the CITI 130(1), i.e., the CITI that received the request 112, then the CITI Manager 132(1) of the CITI 130(1) handles the request 112. The CITI Manager 132(1) queries the local object model instance to obtain the requested CITI-specific information and sends a response 114 back to the client 110 to satisfy the request 112.

If the request 112 relates to a different CITI from the one that received the request 112, however, then the CIC 134(1) handles the request 112, rather than the CITI manager. The CIC 134(1) queries the distributed database formed among the different CICs. In an example, the CIC 134(1) forwards the request 112 to the CIC of the CITI to which the request 112 pertains. The CIC that receives the forwarded request then queries the portion of the distributed database that it stores locally. The CIC then returns the query results to the CIC 134(1), i.e., the CIC of the CITI that originally received the request 112. The CIC 134(1) processes the query results and returns the processed results to the client 110 in the response 114.

In some examples, the CICs perform higher level services, which may relate to multiple CITIs. For example, the CICs can gather, in response to a single request 112, CITI-specific information from multiple CITIs, analyze the information, filter the information, and/or aggregate the information to provide high-level digested results, which pertain to entire CITIs, entire data centers, and/or groups of data centers.

In one particular example, satisfying a client request 112 requires that CITI-specific information be obtained from multiple CITIs. For example, the request 112 may ask to identify the CITI that has the lowest CPU utilization. A single CITI, such as the CITI 130(1), receives the request 112. The CIC 134(1) queries its own portion of the distributed database to obtain the CPU utilization of the CITI 130(1) and contacts each of the other CITIs to direct their CICs to perform similar queries. Each of the CICs returns a query result to the CIC 134(1). The CIC 134(1) then analyzes the returned results and identifies the CITI that has the lowest CPU utilization. The CIC 134(1) then returns the response 114 to the client 110 identifying the CITI with the lowest CPU utilization.

It is understood that any CITI in the environment 100 can serve as an access point for CITI-specific information about any CITI or all CITIs in the environment 100. The client 110 is thus no longer burdened with having to communicate individually with large numbers of CITIs to obtain aggregate information about them or to monitor their individual activities and statuses. Rather, communications are handled efficiently in the distributed database formed from the CICs. Not only is the communication burden off-loaded from the client 110 to the data centers, where it is more easily handled, but also the nature of communication among CICs is inherently more efficient. For example, although it has been described that the CIC on the CITI that receives the request 112 for information about multiple CITIs handles communications with other CITIs individually, this is merely one example. In an alternative arrangement, the CICs on the different CITIs communicate amongst themselves in a gossip network and funnel information through various paths back to the CIC of the CITI that received the request 112. Thus, not only are the data centers more able to handle the data processing demands of communicating with many CITIs than is the client 110, but also the CICs act in coordination with one another to efficiently gather and return the requested information.

Figure 2:
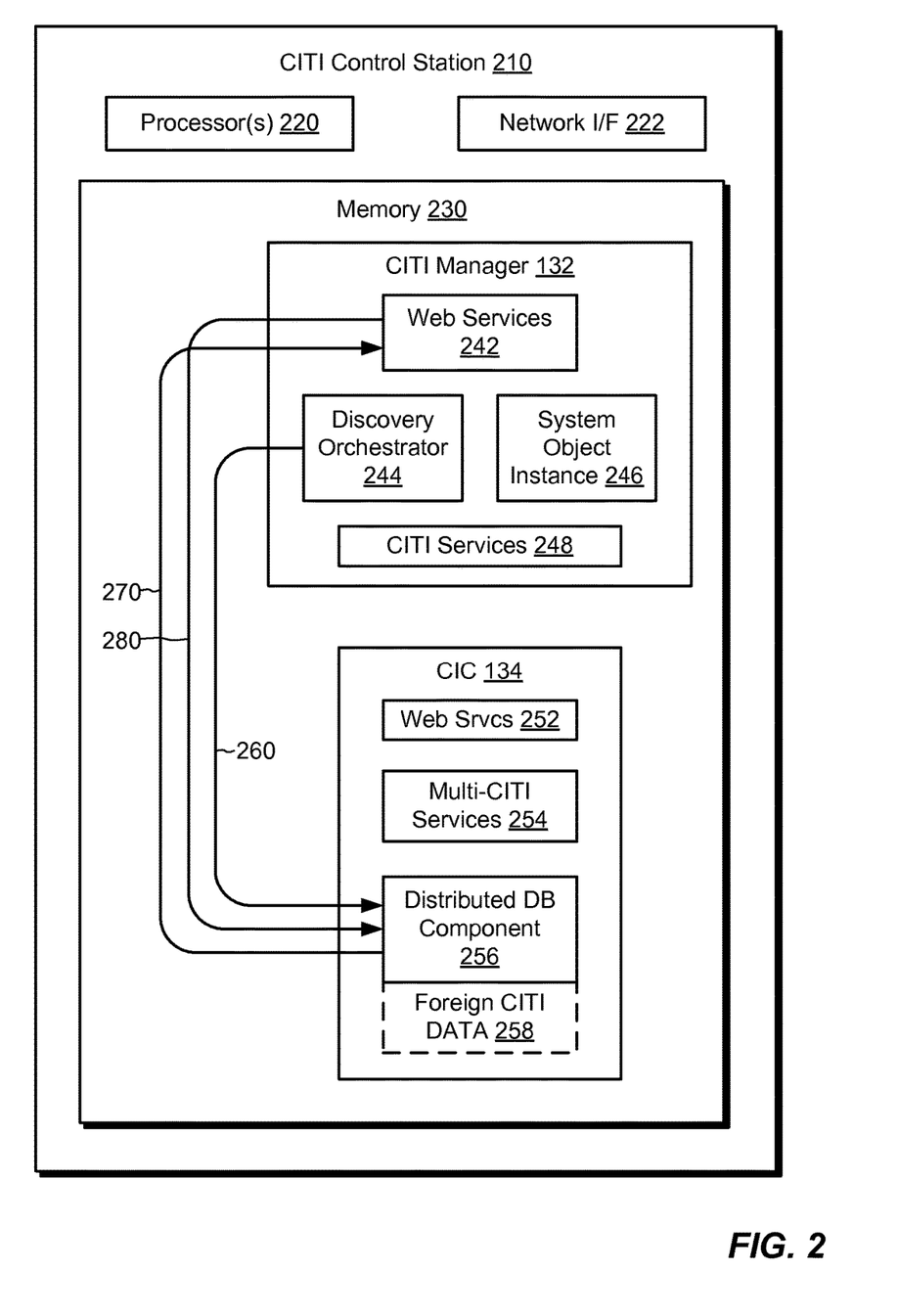
FIG. 2 is a block diagram of an example CITI control station.

FIG. 2 shows an example control station 210, which may be included within any of the CITIs 130(1-5) or otherwise provided in connection with such CITIs. As shown, the control station 210 includes a set of processors, e.g., one or more processing chips and/or assemblies, a network interface 222, e.g., one or more network interface cards (NICs), and memory 230. The memory 230 includes both volatile memory, e.g., RAM, and non-volatile memory, e.g., one or more ROMs, disk drives, and/or electronic flash drives, for example. The set of processors 220 and the memory 230 together form control circuitry, which is constructed and arranged to carry out various methods and functions as described herein.

The memory 230 stores numerous software constructs, including a CITI manager 132 and a CIC 134. The CITI manager 132 and the CIC 134 are representative of the CITI managers 132(1-5) and the CICs 134(1-5), respectively, of FIG. 1. The software constructs 132 and 134 are realized in the form of executable instructions. When the executable instructions are run by the set of processors 220, the set of processors 220 are made to carry out the operations of the software constructs. Although certain software constructs are specifically shown and described, it is understood that the memory 230 typically includes a great many other software constructs, which, for purposes of simplicity, are not shown, such as an operating system and various applications, processes, and daemons.

Although the CITI manager 132 and the CIC 134 are shown as residing on a single computer, this is merely a design choice. Alternatively, the CITI manager 132 can be hosted on one computer and the CIC 134 can be hosted on another.

The CITI manager 132 manages and maintains information about the local CITI, which information may be provided to clients in response to requests. As shown in FIG. 2, the CITI manager 132 includes web services 242, a discovery orchestrator 244, a system object instance 246, and CITI services 248. In an example, the web services 242 provide a REST (Representational State Transfer) interface for receiving requests, such as the request 112, over the network via the network interface 222, servicing the requests, and providing responses, such as the response 114. As is known, REST requests are issued in the form of URIs (Uniform Resource Identifiers) transported over HTTP protocol. REST responses are provided in the form of XML.

The discovery orchestrator 244 performs discovery operations on the CITI in which the control station 210 resides. The discovery orchestrator 244 performs an initial discovery operation a first time a CITI is run, to identify and obtain various identities and characteristics of network, compute, storage, and other components of the CITI, and to store the discovered information in the system object instance 246. The discovery orchestrator 244 may perform subsequent discovery operations, after the initial discovery operation, to selectively interrogate particular components of the CITI in response to configuration changes to any network, compute, storage, or other component of the CITI (e.g., additions, deletions, upgrades, etc.). For some components, the discovery orchestrator 244 regularly interrogates the components for new information, such as new information about CPU utilization, free disk space, network traffic, and other performance data. The discovery orchestrator 244 stores any updated information in the system object instance 246.

The system object instance 246 may take a variety of forms. In one example, the system object instance 246 takes the form of a set of Java objects. In another example, the system object instance 246 takes the form of a database, such as a PostgreSQL database, which stores the system object instance 246 persistently in non-volatile memory.

The CITI services 248 provide services to clients using discovered information stored in the system object instance 246. CITI services 248 may include generating system health metrics and responding to advanced queries, for example.

In contrast with the CITI manager 132, which handles local CITI information, the CIC 134 performs the functions of coordinating with other CITIs. In an example, the CIC 134 includes web services 252, multi-CITI services 254, and a distributed database component 256. The web services 252 provide a REST interface for accessing information pertaining to other CITIs (other than the local CITI) and for accessing information pertaining to multiple CITIs. In an example, the REST interface of the web services 252 of the CIC 134 include, as a subset, the web services 242 of the CITI Manager 132. Thus, while the REST interface of the CIC may respond to requests about other or multiple CITIs, it may use the same REST constructs as is used by the CITI manager when receiving and responding to requests about individual CITIs.

The distributed database component 256 stores information about the CITI in which it resides, and enables the CIC to act as a server to provide information about its local CITI to the distributed database. CICs in other CITIs may thus obtain information about the local CITI from the distributed database component 256.

Optionally, the distributed database component 256 stores foreign CITI data 258. The foreign CITI data 258 includes CITI-specific information obtained from one or more other CITIs. The other CITIs may be any other CITIs in the environment 100. Storing CITI-specific information of one CITI in another CITI promotes high availability of CITI data, as data about a CITI can be obtained through the distributed database even when the CITI itself is off-line.

The multi-CITI services 254 perform data processing on data from other CITIs as well as from multiple CITIs. The Multi-CITI services 254 may include, as a subset, the CITI services 248, for performing services for other CITIs the same way the CITI services 248 perform services for the local CITI. The multi-CITI services 254 also include services for aggregating, filtering, and analyzing data received from multiple CITIs, to provide responses 114 to complex requests 112 involving data from multiple CITIs. A great many services may be provided. A small number of examples may include:

Identifying the CITI with the least CPU utilization;
Identifying the CITI with the greatest amount of free storage space;
Listing all CITIs that include a VMAX storage array;
Listing all CITIs located in India and running a particular application; and
Calculating the total compute capacity of a particular data center.

In operation, the discovery orchestrator 244 performs a discovery procedure and populates the system object instance 246 with discovered CITI-specific information. The discovery orchestrator 260 then sends a message 260 to the distributed database component 256 indicating that discovery is finished (either an initial discovery operation or an updated discovery operation). In response, the distributed database component 256 sends one or more messages 270 to the web services 242 of the CITI manager 242, asking for the newly discovered information. The message(s) 270 may include any number of REST requests, each specifying a URI, and the web services 242 are configured to query the system object instance 246 to obtain the requested data. Data are returned to the distributed database component 256 via one or more REST responses 280, in the form of XML. The distributed database component 256 receives the REST responses and stores the CITI-specific data they contain. If a high availability option is in place, the distributed database component 256 may also direct some or all of the received CITI-specific information of the local CITI to be stored in one or more other CITIs (i.e., in the foreign CITI data 258 of the other CITIs).

With the distributed database component 256 populated with local CITI-specific information, the distributed database component 256 may act as a server for the other CITIs in the distributed database. With the distributed database components 256 of all CITIs populated this way, i.e., with their respective local CITI-specific information, the distributed database formed from the distributed database components 256 may operate to service requests 112 received at any CITI for information about any other CITIs. If the high availability option is in place, CITI-specific information about any CITI may remain available, even if that CITI is temporarily off line.

In one example, the web services 242 and 252 operate independently. For instance, in response to any request 112, either the web services 242 receive the request 112 and generate a response 114 (for the local CITI) or the web services 252 receive the request 112 and generate the response 114 (for remote and/or multiple CITIs). In another example (not shown), the web services 242 and 252 are provided together as a set of single web services, which receives requests 112 pertaining to the local CITI, another CITI, or multiple CITIs, communicates with the system object instance 246 and/or with the distributed database component 246, and returns responses 114 to the client 110. As a variant on this example, the distributed database component 246 may store the only copy of the system object instance 246 at the local CITI, and no specific construct for the system object instance 246 (e.g., Java objects or a PostgreSQL database) need be provided.

Distributed databases are known in the art, and include, for example, Hadoop, Cassandra, Windows Cluster, and PostgreSQL. Any such distributed database technologies may be used to provide the distributed database components 256 and the protocols for communicating among them.

In an example, particular CITIs can join and/or leave the distributed database automatically, in a manner defined by the protocol of the particular distributed database solution employed. In one example, the control station 210 on which a distributed database object 256 resides is configured with an open port to perform auto-registration with the distributed database. When a CITI is brought online, its distributed database component 246 sends out a signal on the open port. The signal is received by other distributed database components 246 on other CITIs, which recognize the new member and incorporate it into their distributed database structure. Using this or some other auto-registration protocol, CITIs can be preconfigured (e.g., in the factory) to automatically join with other CITIs to form distributed databases once the CITIs are brought online Initial configurations can specify group memberships and security settings, such that, for example, CITIs belonging to the same company can find one another and CITIs belonging to different companies cannot find or communicate with each other.

Figure 3:
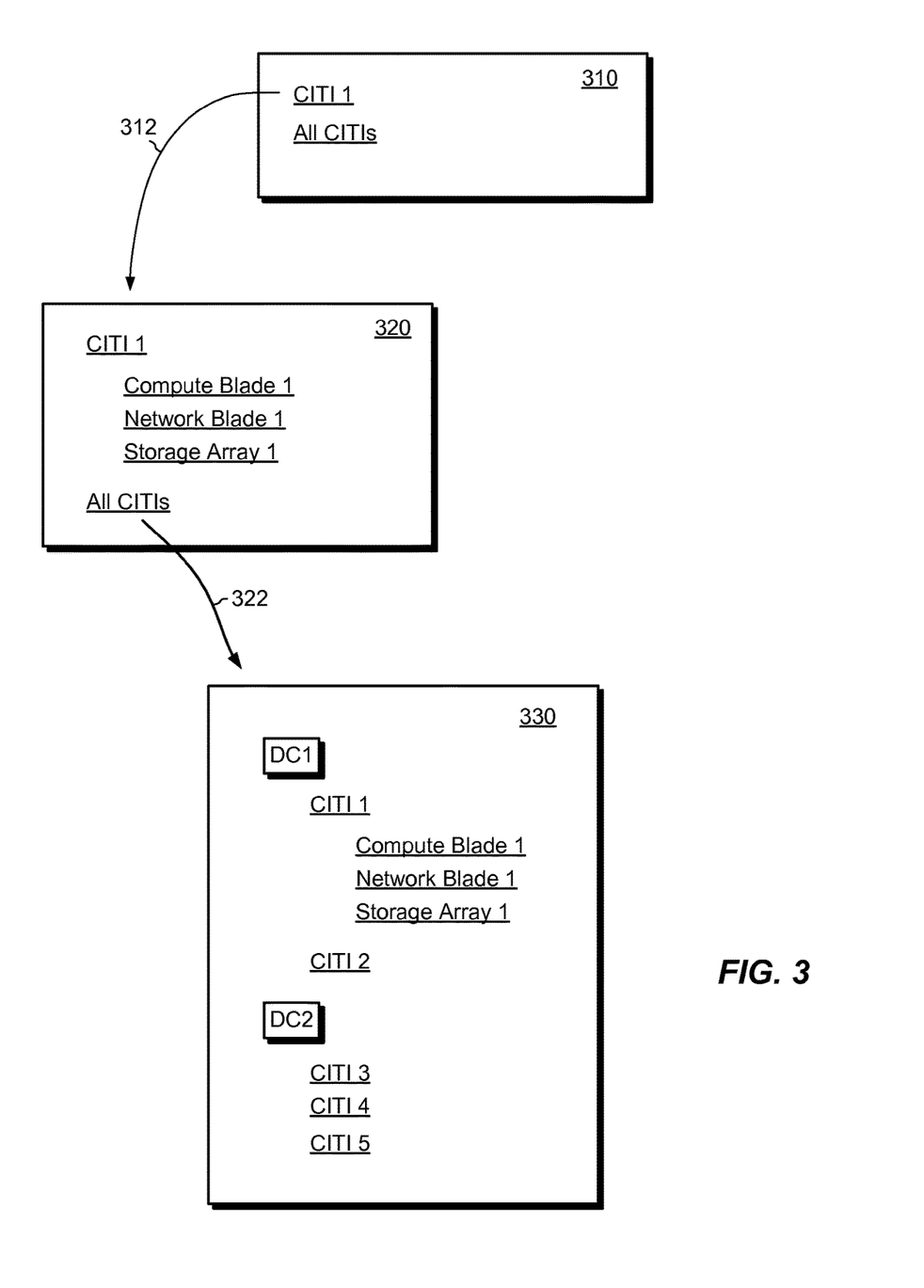
FIG. 3 is a diagram showing a sequence of partial screen shots of an administrative tool, which show example output that may be generated using the improvements hereof.

FIG. 3 shows an example sequence of screen shots of an administrative tool running on the client 110 and interacting with a particular CITI in the environment 100. Here, the client 110 has established a communication session with the control station 210 of CITI 1 (e.g., 130(1)). Screen shot 310 shows an initial display. Each underlined element is a link, which a user may click to drill down and/or obtain additional information about the respective element. The user may click a link for "CITI 1 " or a link for "ALL CITIs."

If the user clicks the link for "CITI 1 ," i.e., to obtain information about the CITI with which the administrative tool is already communicating, action 312 is performed, which replaces the screen 310 with a screen 320. In an example, in response to the user clicking the "CITI 1 " link, the administrative tool generates a request 112, i.e., a REST request, which specifies a particular URI recognized by the web services 242 of the CITI manager 132 of CITI 1. The web services 242 process the URI and use it to retrieve a particular set of records in the system object instance 246. The web services 242 then return a response 114, i.e., a REST response providing XML. The administrative tool interprets the XML and displays the content it contains, i.e., the fact that CITI 1 includes a "Compute Blade 1," a "Network Blade 1," and a "Storage Array 1." For simplicity, only three components are shown and these components are shown generically.

The user may then click the link designating "All CITIs," in which case action 322 is performed, and the screen 320 is replaced by the screen 330. In an example, the administrative tool generates another REST request 112, which specifies a particular URI recognized by the web services 252 of the CIC 134 of CITI 1. The web services 252 process the URI and use it to retrieve a particular set of records from the distributed database component 256. If the requested information is not stored locally in the distributed database component 256 of CITI 1, the distributed database component 256 of CITI 1contacts one or more other CITIs to obtain the requested information from their database components. The distributed database component 256 of CITI 1 receives the information from the other CITIs and provides the information to the web services 252, which package the information as an XML response 214. The response 214 is sent to the client 110. The administrative tool interprets the XML of the response 214 and displays the content it contains, in this case information about multiple data centers (DC1and DC2) and their components. The user may continue to click links to obtain other information, which will result in operations similar to those described above.

Figure 4:
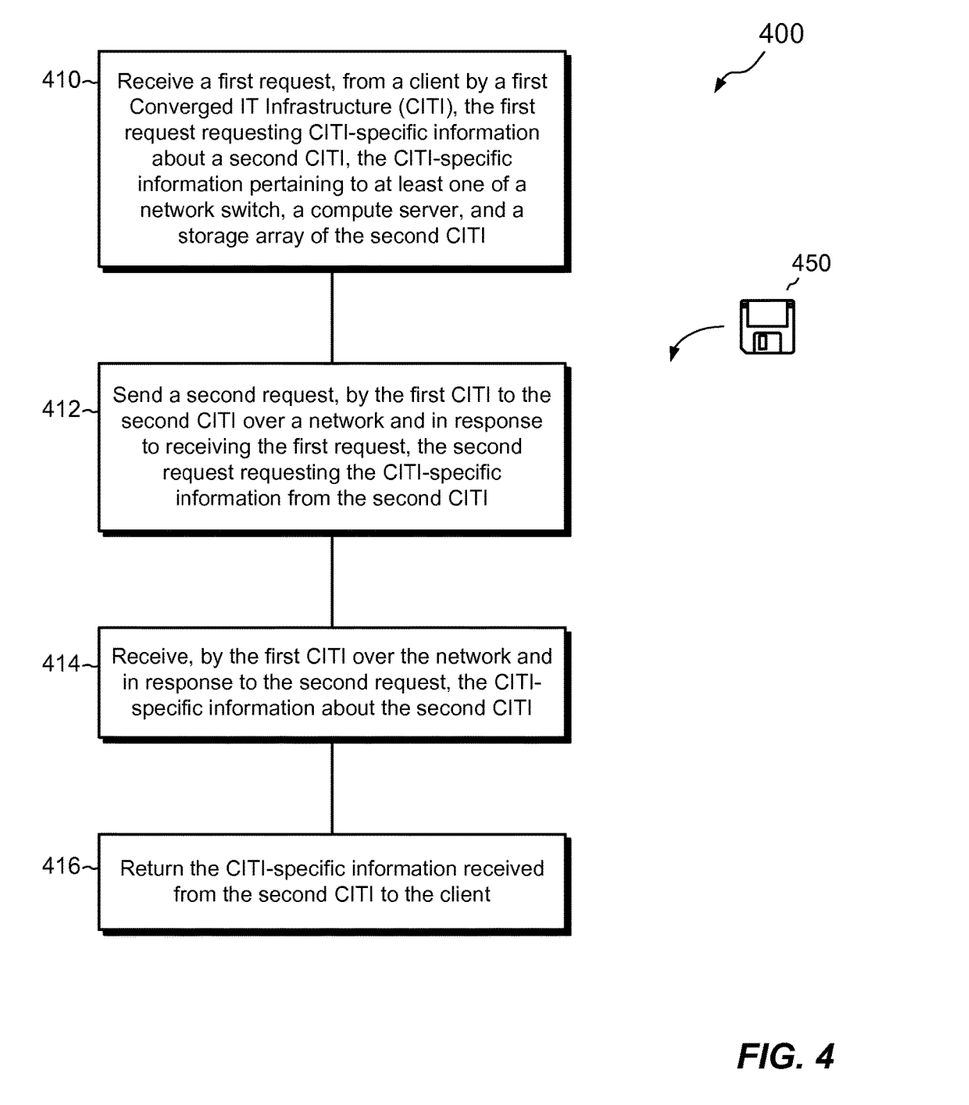
FIG. 4 is a flowchart showing an example method according to the improvements hereof for communicating among different CITIs within a data center or across multiple data centers.

FIG. 4 shows a process 400 for communicating among Converged IT Infrastructures (CITIs). The process 400 may be carried out in connection with the data center environment 100. The process 400 is typically performed by the software constructs, described in connection with FIGS. 1 and 2, which reside in the memory 230 of the control station 210 and are run by the set of processors 220. The various acts of the process 400 may be ordered in any suitable way. Accordingly, embodiments may be constructed in which acts are performed in orders different from those illustrated, which may include performing some acts simultaneously, even though the acts are shown as sequential in the illustrated embodiments.

At step 410, a first CITI receives a first request from a client. The first request requests CITI-specific information about a second CITI. The CITI-specific information pertains to at least one of a network switch, a compute server, and a storage array of the second CITI. For example, the web services 252 of a first CITI, such as CITI 130(1), receive a REST request 112 from the client 110. The REST request 112 is for CITI-specific information about a second CITI, such as CITI 130(2).

At step 412, the first CITI sends a second request. The second request is sent to the second CITI over a network and in response to receiving the first request. The second request requests the CITI-specific information from the second CITI. For example, the distributed database component 256 of the first CITI 130(1) sends a request to the distributed database component 256 of the second CITI 130(2) over the network (here, the LAN 122), requesting information about the second CITI 130(2).

At step 414, the first CITI receives, over the network and in response to the second request, the CITI-specific information about the second CITI. For example, the distributed database component 256 of the first CITI 130(1) receives the information obtained from the distributed database component 256 of the second CITI 130(2) over the LAN 122.

At step 416, the CITI-specific information received from the second CITI is returned to the client. For example, the web services 252 of the first CITI 130(1) send a REST response 114 (XML), including the requested information to the client 110.

An improved technique has been described for communicating with multiple Converged IT Infrastructures (CITIs). The improved technique includes accessing any CITI that is part of a group of multiple CITIs by accessing a single CITI within the group. In this manner, a client need only communicate with a single CITI to obtain information about any CITI in the group. The burdensome task of maintaining communication with multiple CITIs is therefore reduced or eliminated altogether. The CIC may also aggregate, filter, and/or analyze information gathered from multiple CITIs, thereby allowing clients to receive processed data pertaining to many CITIs in response to simple commands.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. Although certain embodiments are disclosed herein, it is understood that these are provided by way of example only and the invention is not limited to these particular embodiments.

Having described certain embodiments, numerous alternative embodiments or variations can be made. For example, it has been shown and described that each CITI 130($i$) includes a respective CIC 134($i$). However, this is merely an example. Alternatively, CICs may be provided in any suitable arrangement, such as one per data center, or one per set of CITIs on a particular network or sub-net. In this arrangement, each CIC includes CITI-specific information about all the CITIs in its respective set and coordinates with other CICs representing other sets of CITIs.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 450 in FIG. 4). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Those skilled in the art will therefore understand that various changes in form and detail may be made to the embodiments disclosed herein without departing from the scope of the invention.

What is claimed is:

1. A method of communicating among multiple computer systems, each of which comprises a single logical entity and has components including one or more network switches, compute servers, and storage arrays, the method comprising a computer system of the multiple computer systems:

receiving, from a client, a request for computer system-specific information about the multiple computer systems, the computer system-specific information pertaining to the one or more network switches, compute servers, and storage arrays of the multiple computer systems, the multiple computer systems further including respective software constructs each of which stores computer system-specific information about one of the multiple computer systems, the respective software constructs together form a distributed database storing computer system-specific information about the multiple computer systems, each of the multiple computer systems being an access point for the computer system-specific information about any or all of the multiple computer systems, and the computer system including a software construct of the respective software constructs;

querying the distributed database formed by the respective software constructs of the multiple computer systems, over a network and in response to the request, the distributed database being queried by the software construct of the computer system and for the computer system-specific information about the multiple computer systems;

receiving, over the network and in response to querying the distributed database, the computer system-specific information about the multiple computer systems; and returning the computer system-specific information to the client in response to the request, the computer system-specific information about the multiple computer systems thereby being obtained by the client without the client having to communicate individually with each of the multiple computer systems.

2. The method of claim 1, wherein at least two of the multiple computer systems are at the same geographical location, and wherein a third computer system is at a different geographical location.

3. The method of claim 1, further comprising:
performing a discovery operation on the computer system to obtain information about at least one of the components of the computer system; and in response thereto, storing information obtained from the discovery operation in the software construct of the computer system.

4. The method of claim 3, wherein the discovery operation is one of (i) an initial discovery operation performed on each of the multiple computer systems to identify components of each of the multiple computer systems, or (ii) a subsequent discovery operation performed after the initial discovery operation to identify changes in any of the components of each of the multiple computer systems.

5. The method of claim 3, wherein the computer system includes a computer system manager, and wherein the method further comprises the computer system manager, prior to storing information obtained from the discovery operation in the software construct of the computer system:
receiving, from the software construct of the computer system, a representational state transfer (REST) request for information about at least one of the components of the computer system; and
providing a REST response to the software construct of the computer system providing the information requested in the REST request.

6. The method of claim 5, wherein the request is a REST request from the client for information pertaining to the multiple computer systems.

7. The method of claim 1, further comprising, after receiving the computer system-specific information about the multiple computer systems, storing the computer system-specific information about the multiple computer systems in the software construct of the computer system.

8. The method of claim 7, further comprising:
receiving another request from the client for computer system-specific information about one of the multiple computer systems; and
obtaining the computer system-specific information about the one of the multiple computer systems from the software construct of the computer system.

9. The method of claim 1, further comprising aggregating the computer system-specific information received in response querying the distributed database to produce aggregate data pertaining to the multiple computer systems.

10. The method of claim 1, further comprising filtering the computer system-specific information received in response to querying the distributed database to produce filtered data pertaining to a subset of the multiple computer systems.

11. The method of claim 1, further comprising analyzing the computer system-specific information received in response to querying the distributed database to identify a set of computer systems that are experiencing low workload.

12. The method of claim 1, further comprising providing a representational state transfer (REST), response to the client, the REST response pertaining to the multiple computer systems.

13. The method of claim 1 further comprising the software construct of the computer system:
receiving a notification from a new software construct of a new computer system that the new computer system has been brought online on the network; and
engaging in an interactive protocol with the new software construct of the new computer system to obtain access to computer system-specific information of the new computer system through the new software construct of the new computer system.

14. A computer system for communicating among multiple computer systems, each of which comprises a single logical entity and has components including one or more network switches, compute servers, and storage arrays the computer system comprising:
a processor; and
memory, coupled to the processor, the memory storing executable instructions, which when executed by the processor, cause the processor to:
receive, from a client, a request for computer system-specific information about the multiple computer systems, the multiple computer systems further including respective software constructs each of which stores computer system-specific information about one of the multiple computer systems, the respective software constructs together form a distributed database storing computer system-specific information about the multiple computer systems, the computer system-specific information pertaining to the one or more network switches, compute servers, and storage arrays of the multiple computer systems, each of the multiple computer systems being an access point for the computer system-specific information about any or all of the multiple computer systems, and the computer system including a software construct of the respective software constructs;
query the distributed database formed by the respective software constructs of the multiple computer systems, over a network and in response to the request, the distributed database being queried by the software construct of the computer system and for the computer system-specific information about the multiple computer systems;
receive, over the network and in response to the query of the distributed database, the computer system-specific information about the multiple computer systems; and
return the computer system-specific information to the client in response to the request, the computer system-specific information about the multiple computer systems thereby being obtained by the client without the client having to communicate individually with each of the multiple computer systems.

15. The computer system of claim 14, wherein the executable instructions further cause the processor to store the computer system-specific information about the multiple computer systems in the software construct of the computer system.

16. A non-transitory computer readable medium including instructions which, when executed by a processor of a computer system of multiple computer systems, cause the processor to perform a method of communicating among the multiple computer systems, each of which comprises a single logical entity and has components including one or more network switches, compute servers, and storage arrays, the method comprising the computer system:

receiving, from a client, a request for computer system-specific information about multiple computer systems, the computer system-specific information pertaining to the one or more network switches, compute servers, and storage arrays of the multiple computer systems, the multiple computer systems further including respective software constructs each of which stores computer system-specific information about one of the multiple computer systems, the respective software constructs together form a distributed database storing computer system-specific information about the multiple computer systems, each of the multiple computer systems being an access point for the computer system-specific information about any or all of the multiple computer systems, and the computer system including a software construct of the respective software constructs;

querying the distributed database formed by the respective software constructs of the multiple computer systems, over a network and in response to the request, the distributed database being queried by the software construct of the computer system and for the computer system-specific information about the multiple systems;

receiving, over the network and in response to querying the distributed database, the computer system-specific information about the multiple computer systems; and returning the computer system-specific information to the client in response to the request, the computer system-specific information about the multiple computer systems thereby being obtained by the client without the client having to communicate individually with each of the multiple computer systems.

17. The non-transitory computer readable medium of claim 16, wherein the method further comprises:

performing a discovery operation on the computer system to obtain information about at least one of the components of the computer system; and in response thereto, storing information obtained from the discovery operation in the software construct of the computer system.

18. The non-transitory computer readable medium of claim 17, wherein the request is a representational state transfer (REST) request from the client for information pertaining to the multiple computer systems.

* * * * *

UNITED STATES PATENT AND TRADEMARK OFFICE
CERTIFICATE OF CORRECTION

PATENT NO. : 10,244,080 B2
APPLICATION NO. : 13/843262
DATED : March 26, 2019
INVENTOR(S) : Nandyalam et al.

Page 1 of 1

It is certified that error appears in the above-identified patent and that said Letters Patent is hereby corrected as shown below:

In the Claims

In Column 12, Claim 9, Line 1, "response querying" should read -- response to querying --

In Column 14, Claim 16, Line 6, "the multiple systems" should read -- the multiple computer systems --

Signed and Sealed this
Seventh Day of May, 2019

Andrei Iancu
*Director of the United States Patent and Trademark Office*